United States Patent
Wallentin et al.

(10) Patent No.: US 6,447,003 B1
(45) Date of Patent: *Sep. 10, 2002

(54) AIRBAG MODULE HAVING AN AIRBAG WITH A RECEIVING POCKET FOR THE GAS GENERATOR

(75) Inventors: Rainer Wallentin; Thomas Weberpals, both of München (DE)

(73) Assignee: Autoliv Development AB (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/380,057

(22) PCT Filed: Feb. 13, 1998

(86) PCT No.: PCT/EP98/00834

§ 371 (c)(1), (2), (4) Date: Aug. 20, 1999

(87) PCT Pub. No.: WO98/36947

PCT Pub. Date: Aug. 27, 1998

(30) Foreign Application Priority Data

Feb. 20, 1997 (DE) .......................... 197 06 674

(51) Int. Cl.⁷ .............................. B60R 21/16
(52) U.S. Cl. .................................. 280/728.2
(58) Field of Search ................. 280/743.1, 728.1, 280/728.2, 730.2

(56) References Cited

U.S. PATENT DOCUMENTS 5,022,675 A    6/1991  Zelenak, Jr. et al.
5,310,216 A  * 5/1994  Wehner et al. ........... 280/743.1
5,632,506 A  * 5/1997  Shellabarger ............ 280/743.1
5,791,685 A  * 8/1998  Lachat et al. ............ 280/743.1
5,865,467 A  * 2/1999  Bito et al. ............... 280/743.1
5,975,571 A  * 11/1999 Ford et al. ............... 280/743.1
6,089,599 A  * 7/2000  Schimmoller et al. ...... 280/740
6,270,113 B1 * 8/2001  Wipasuramonton et al. ..... 280/728.1
6,279,944 B1 * 8/2001  Wipasuramonton et al. ..... 280/729

FOREIGN PATENT DOCUMENTS

| DE | 43 24 487 | 1/1995 |
| DE | 44 23 552 | 1/1996 |
| DE | 195 32 369 | 3/1996 |
| EP | 0 633 168 | 1/1995 |
| EP | 0 812 736 | 12/1997 |
| WO | WO 90/13458 | 11/1990 |

* cited by examiner

Primary Examiner—Anne Marie Boehler
Assistant Examiner—Faye M. Fleming
(74) Attorney, Agent, or Firm—R W Becker & Associates; R W Becker

(57) ABSTRACT

An airbag module has an airbag made of two fabric layers each having a lateral offset. The two fabric layers are circumferentially connected to one another by a seam. The lateral offsets together form a receiving pocket into which a gas generator is inserted. The gas generator has projecting pin-shaped securing elements. The pocket has penetrating openings and at least one fabric flap. The flap has an auxiliary opening. The pin-shaped securing elements are received in the penetrating openings to thereby secure the gas generator in the pocket. The flap, after insertion of the gas generator into the pocket and of pin-shaped securing elements in penetrating openings, is folded over such that the auxiliary opening is placed onto one of the pin-shaped securing elements.

7 Claims, 1 Drawing Sheet

AIRBAG MODULE HAVING AN AIRBAG WITH A RECEIVING POCKET FOR THE GAS GENERATOR

BACKGROUND OF THE INVENTION

The invention relates to an airbag module having an airbag comprised of a fabric, and a gas generator, arranged in a pocket of the airbag, whereby the gas generator has projecting pin-shaped securing means which project through openings in the airbag.

An airbag module with the aforementioned features is known from DE 195 32 369 A1. The corresponding airbag has, based on its substantially cylindrical shape in the inflated state, a laterally attached pocket for receiving the gas generator whereby the pocket is matched to the inner contour of the airbag module housing which receives the gas generator and the folded airbag. The edge portion of the pocket is sewn onto the fabric of the main portion of the airbag by a circumferential seam. The pocket of the airbag comprises a plurality of openings aligned with corresponding bores in the housing of the airbag module through which pin-shaped securing means for fastening the airbag module to a vehicle part. Such an airbag design of two individual parts sewn together is complicated and expensive, and assembly of airbag and gas generator to an airbag module is cumbersome.

A one-part design of an airbag with attached pocket is disclosed in EP 0 471 762 B1. In this known arrangement, the two fabric layers which form the airbag have a flap-like projection whereby, upon assembly of the airbag arrangement, the gas generator is placed between the two projections of the fabric layers and these fabric layers are placed with partial embracing of the gas generator about the gas generator. For attachment of the two separate flap-shaped projections to the gas generator, the gas generator is provided with pin-shaped projections spaced in the longitudinal direction to one another, and the two flap-shaped projections of the fabric layers have matching openings so that the two flap-shaped projections can be fastened at the gas generator by placing the openings provided therein onto the pin-shaped projections. This known arrangement has the disadvantage that the assembly of the airbag module is complicated because the two individual flap-shaped projections must be placed separately about the gas generator, and their openings must be threaded onto the projections of the gas generator. Furthermore, sealing of the airbag in the area of the receiving chamber provided by the flap-shaped projections for receiving the gas generator is often not satisfactory.

Further such embodiments of an airbag with overlapping flaps for mounting the gas generator at the airbag are known from DE 44 23 552 A1 or EP 0 633 168 A1.

The invention has the object to improve an airbag module with the aforementioned features in regard to assembly and sealing of the airbag in the area of the gas generator receiving means.

SUMMARY OF THE INVENTION

The invention provides according to its basic idea that the two fabric layers enveloping the gas generator are connected to one another by a seam and the seam for forming the pocket has a lateral offset and that at at least one part of the offset a flap is provided which is folded over and secured with at least one opening on the pin-shaped fastening means of the gas generator.

The invention has the advantage that the embodiment of a receiving pocket for the gas generator, already accomplished during manufacture of the airbag by weaving and/or sewing, reduces the assembly expenditure is because assembly only requires the gas generator to be inserted into the pocket whereby the openings provided in the area of the pocket are then oriented toward the pin-shaped securing means projecting from the gas generator. Subsequently, only the overlapping portion in the form of a flap in the area of the offset must be folded over and must be placed with its corresponding openings also onto the pin-shaped fastening means. By this folding action, the plays remaining in the area of the pocket upon formation of the pocket because of the fastening means projecting from the gas generator, is eliminated so that the double layer of the airbag fabric resulting from folding over the seam area provides an improved total sealing action of the airbag. Due to the arrangement of the gas generator in the seam area of the airbag fabric the fabric, loading occurring during inflation of the gas bag is received and distributed in an improved manner whereby, because of the large surface area contact of the airbag fabric at the gas generator, the forces acting on the airbag are minimized. At the openings in the airbag fabric for receiving the securing means essentially no forces will occur.

According to one embodiment of the invention it is suggested that the outer seam at one end of the pocket is closed and the pocket at its other end is provided with an insertion opening for the gas generator; this arrangement has the advantage that the sealing action of the airbag portion for receiving the gas generator is further improved because leakage can only occur in the area of the insertion opening. These leakages, however, are eliminated especially by the inventive folding over of the excess seam portion in the form of a flap.

For improving the assembly, it may be provided that the insertion opening of the pocket has a diverging portion and the flaplaterally projecting that is to be folded over the gas generator extends into the area of the diverging portion of the insertion opening. With this diverging portion the mounting opening for the gas generator is increased so that assembly is facilitated and an easy alignment of the gas generator is ensured.

One embodiment of the invention suggests that over the length of the gas generator two pin-shaped projections are arranged and that the pocket and the flap of the seam have correlated openings.

In a unknown manner the manufacture of the outer seam according to embodiments of the invention can be realized by sewing the two fabric layers together or by providing a woven connection of the two fabric layers during weaving of the airbag.

According to one embodiment of the invention, the securing means can be embodied as fastening screws that can be threaded into correlated bores and project from the gas generator.

It may be provided that the securing means serve, in addition to securing the airbag, also asr attachment meansof the gas generator at a vehicle structure such as the steering wheel, etc., so that accordingly these securing means have a double function.

BRIEF DESCRIPTION OF THE DRAWINGS

In the drawing an embodiment of the invention is represented which will be explained in the following. It is shown in.

DESCRIPTION OF PREFERRED EMBODIMENTS

Figure 1:
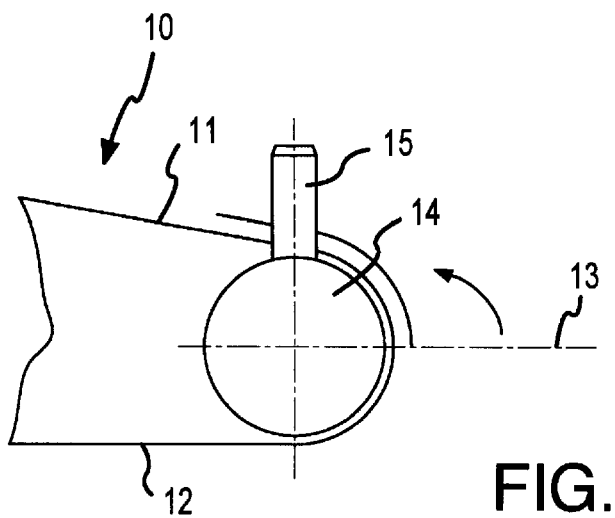
FIG. 1: The seam area of an airbag for receiving the gas generator with gas generator inserted, shown in a partial side view.

As can be seen in FIG. 1, the airbag 10 is comprised of an upper fabric layer 11 and a lower fabric layer 12 which are connected to one another in the area of an outer seam 13, i.e., they are sewn together or woven as a single piece. In this seam area, a gas generator 14 is inserted into the airbag 10 which has radially projecting pin-shaped securing means 15 in the form of pin-shaped projections. In the shown embodiment, the gas generator has a cylindrical tubular design, however, the invention is not limited to such a shape of the gas generator. As can be seen in FIG. 1, for connecting the airbag fabric to the gas generator 14, the seam 13 is folded about the gas generator 14 and is placed with correlated openings onto the pin-shaped projections 15 projecting from the gas generator 14. This allows for assembly of the airbag arrangement without auxiliary components or tools.

Figure 2:
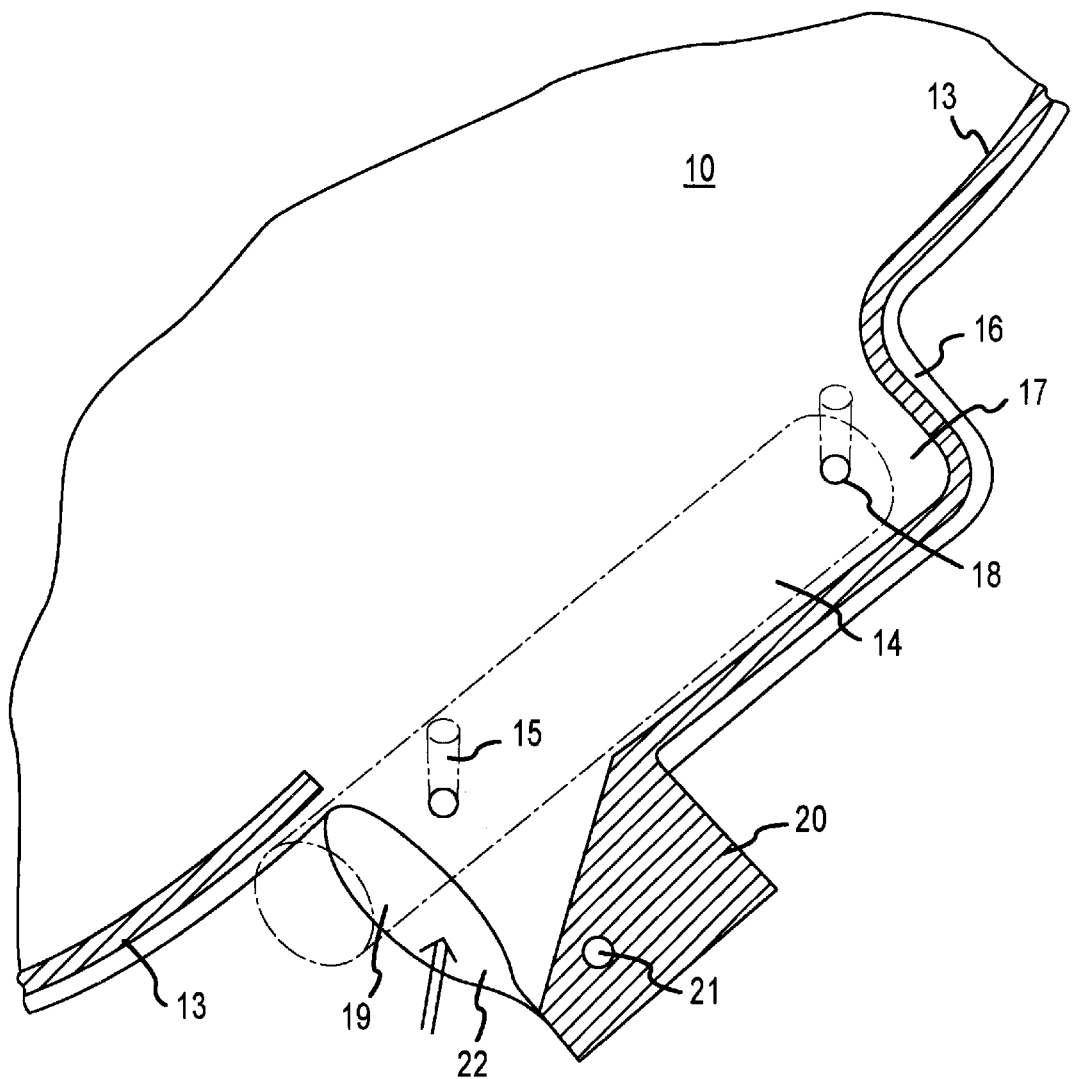
FIG. 2: The object of FIG. 1 in an enlarged schematic representation.

In FIG. 2 the area of the outer seam 13 for receiving the gas generator 14 is represented at an enlarged scale, and from this it can be taken that the outer seam 13 in the area of the gas generator receiving means has a lateral offset 16 by which a pocket 17 is formed that projects relative to the circumferential outer seam 13. Into this pocket 17 the gas generator 14 is inserted, as is shown in the representation of FIG. 2. In the area of the pocket 17 one of the two fabric layers 11,12, in the shown embodiment the upper fabric layer 11, has openings 18 whereby the pin-shaped projections 15 for mounting of the gas generator 14 are arranged such that the pin-shaped projections 15 penetrate the openings 18 and thus project past the upper fabric layer 11 to the exterior. In the area of the lateral offset 16 the outer seam 13 is continuous so that the pocket 17 at one end is closed and sealed. At the opposite end, the pocket 17 has an insertion opening 19 which, for facilitating the insertion of the gas generator 14, has a diverging portion 22. In the shown embodiment, the outer seam 13 has a laterally projecting flap 20 in which an additional opening 21 is provided. This lateral flap 20 is designed such that it can be folded over the gas generator 14 inserted into the pocket 17 and can be placed with its opening 21 onto the pin-shaped projection 15 of the gas generator 14 which projects from the airbag fabric 12. In the shown embodiment the flap 20 is arranged especially in the area of the funnel-shaped widened portion 22 of the insertion opening 19 so that the folding of the flap 20 will reduce the cross-sectional area of the insertion opening 19 which is greater than the size of the gas generator 14. Accordingly, in the area of the insertion opening 19 a sufficient sealing action of the airbag 10 is achieved by folding and the resulting double layer formation of the outer seam 13.

The flap 20 can also extend over the entire length of the pocket 17, even though this is not represented, and can then be placed with correspondingly provided openings 21 on the pin-shaped projections 15 of the gas generator 14.

The present invention is, of course, in no way restricted to the specific disclosure of the specification and drawings, but also encompasses any modifications within the scope of the appended claims.

What is claimed is:

1. An airbag module comprising:

an airbag (10) comprised of two fabric layers (11, 12);

said two fabric layers (11, 12) each having a lateral offset (16);

said two fabric layers (11, 12) circumferentially connected to one another by a seam (13), wherein said seam (13) connects said lateral offsets (16) along longitudinal edges of said offsets (16) to form a receiving pocket (17), wherein said receiving pocket is closed only on one side;

a gas generator (14) inserted into said receiving pocket (17);

said gas generator (14) comprising projecting pin-shaped securing means (15);

said pocket (17) having penetrating openings (18) and at least one fabric flap (20);

said flap having an auxiliary opening (21);

said pin-shaped securing means (15) received in said penetrating openings (18) to thereby secure said gas generator (14) in said pocket (17);

said flap (20), after insertion of said gas generator into said pocket (17) and of said pin-shaped securing means (15) in said penetrating openings (18), folded over such that said auxiliary opening (21) is placed onto one of said pin-shaped securing means (15), wherein said seam (13) closes a first end of said pocket (17) and wherein a second end of said pocket (17) has a single insertion opening (19) for said gas generator (14).

2. The airbag module according to claim 1, wherein said insertion opening (19) of said pocket (17) has a diverging portion (22) and wherein said flap (20) to be folded about said gas generator (14) extends into an area of said diverging portion (22).

3. The airbag module according to claim 1, wherein over a length of said gas generator (14) at least two of said pin-shaped securing means (15) are distributed and wherein said pocket (17) has a matching number and arrangement of said penetrating openings (18).

4. The airbag module according to claim 1, wherein said seam (13) is produced by sewing said two fabric layers (11, 12) together.

5. The airbag module according to claim 1, wherein said seam (13) is a woven connection of said two fabric layers (11, 12) produced during weaving of said airbag (10).

6. The airbag module according to claim 1, wherein said securing means (15) are fastening screws projecting from said gas generator (14) and threaded into matching bores of said gas generator (14).

7. The airbag module according to claim 1, wherein said fastening means (15) additionally secure said gas generator (14) to a vehicle structure.

* * * * *